United States Patent
Macor

(10) Patent No.: US 12,083,735 B2
(45) Date of Patent: Sep. 10, 2024

(54) METHOD AND APPARATUS FOR GENERATING A SUPERFICIAL STRUCTURE

(71) Applicant: Giorgio Macor, Martignacco (IT)

(72) Inventor: Giorgio Macor, Martignacco (IT)

(*) Notice: Subject to any disclaimer, the term of this patent is extended or adjusted under 35 U.S.C. 154(b) by 99 days.

(21) Appl. No.: 17/269,374

(22) PCT Filed: Aug. 21, 2019

(86) PCT No.: PCT/IB2019/057033
§ 371 (c)(1),
(2) Date: Feb. 18, 2021

(87) PCT Pub. No.: WO2020/039361
PCT Pub. Date: Feb. 27, 2020

(65) Prior Publication Data
US 2021/0187823 A1  Jun. 24, 2021

(30) Foreign Application Priority Data

Aug. 22, 2018 (IT) .................. 102018000008133
May 28, 2019 (IT) .................. 102019000007377

(51) Int. Cl.
| | | |
|---|---|---|
| *B29C 64/112* | (2017.01) | |
| *B29C 64/188* | (2017.01) | |
| *B33Y 10/00* | (2015.01) | |
| *B33Y 40/20* | (2020.01) | |
| *C09D 11/101* | (2014.01) | |
| *C09D 11/102* | (2014.01) | |
| *C09D 151/08* | (2006.01) | |

(52) U.S. Cl.
CPC .......... *B29C 64/112* (2017.08); *B29C 64/188* (2017.08); *B33Y 10/00* (2014.12); *B33Y 40/20* (2020.01); *C09D 11/101* (2013.01); *C09D 11/102* (2013.01); *C09D 151/08* (2013.01)

(58) Field of Classification Search
CPC .............. B41M 7/0081; B41M 7/0027; B41M 7/0036; B41M 7/0054; B41M 7/009; B29C 64/106; B29C 64/112; B29C 35/02; B29C 59/026; B05D 1/36; B05D 5/02; B05D 3/06; B05D 3/061; B05D 3/068; B05D 3/107; B05D 3/108
See application file for complete search history.

(56) References Cited

U.S. PATENT DOCUMENTS

| | | |
|---|---|---|
| 3,459,407 A | 8/1969 | Hazlehurst et al. |
| 7,520,601 B2 * | 4/2009 | Claes ................. B41J 11/00214 |
| | | 347/102 |

(Continued)

FOREIGN PATENT DOCUMENTS

| | | |
|---|---|---|
| DE | 102010036454 | 1/2012 |
| EP | 0210620 | 4/1987 |

(Continued)

*Primary Examiner* — Michael P Wieczorek
(74) *Attorney, Agent, or Firm* — Maschoff Brennan

(57) ABSTRACT

A method and related apparatus for generating a surface structure includes the steps of: (A) applying a resin A on the surface of a material; (B) applying a liquid B on at least one portion of the resin A, when the resin A is liquid or partially solidified; (C) polymerizing, also separately, the resin A and the liquid B; and (D) removing the polymerized liquid B.

13 Claims, 3 Drawing Sheets

(56) References Cited

U.S. PATENT DOCUMENTS

| | | | | |
|---|---|---|---|---|
| 7,628,481 B2* | 12/2009 | Kadomatsu | .......... | B41M 5/0017 |
| | | | | 347/101 |
| 9,365,028 B2* | 6/2016 | Vogel | ........................ | B44F 9/02 |
| 2013/0302625 A1 | 11/2013 | Becker-Weimann | | |
| 2018/0042718 A1 | 2/2018 | Sayaka | | |
| 2019/0315087 A1* | 10/2019 | Macor | .................... | B29C 35/08 |
| 2020/0368777 A1* | 11/2020 | Pankoke | .................. | B05D 3/12 |

FOREIGN PATENT DOCUMENTS

| | | | | |
|---|---|---|---|---|
| EP | 1652686 | | 5/2006 | |
| EP | 2373494 | | 6/2010 | |
| EP | 3109056 | | 12/2016 | |
| EP | 3415316 | | 12/2018 | |
| IT | 102018000008133 | | 2/2020 | |
| WO | 9221450 | | 12/1992 | |
| WO | 03057458 | | 7/2003 | |
| WO | 2013014393 | | 1/2013 | |
| WO | 2018069874 | | 4/2018 | |
| WO | WO-2018069874 A1 * | 4/2018 | ............... | B05D 1/36 |

\* cited by examiner

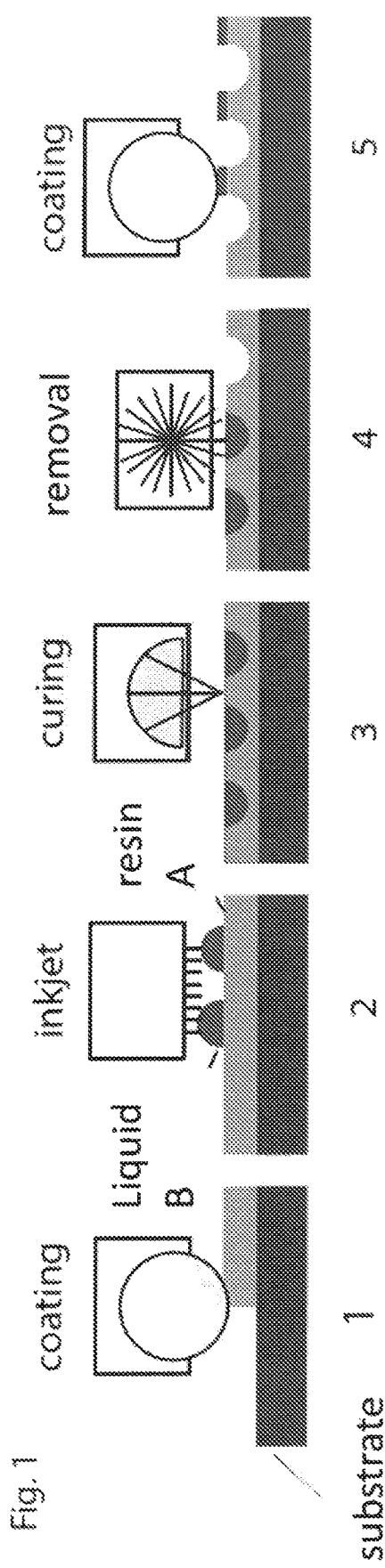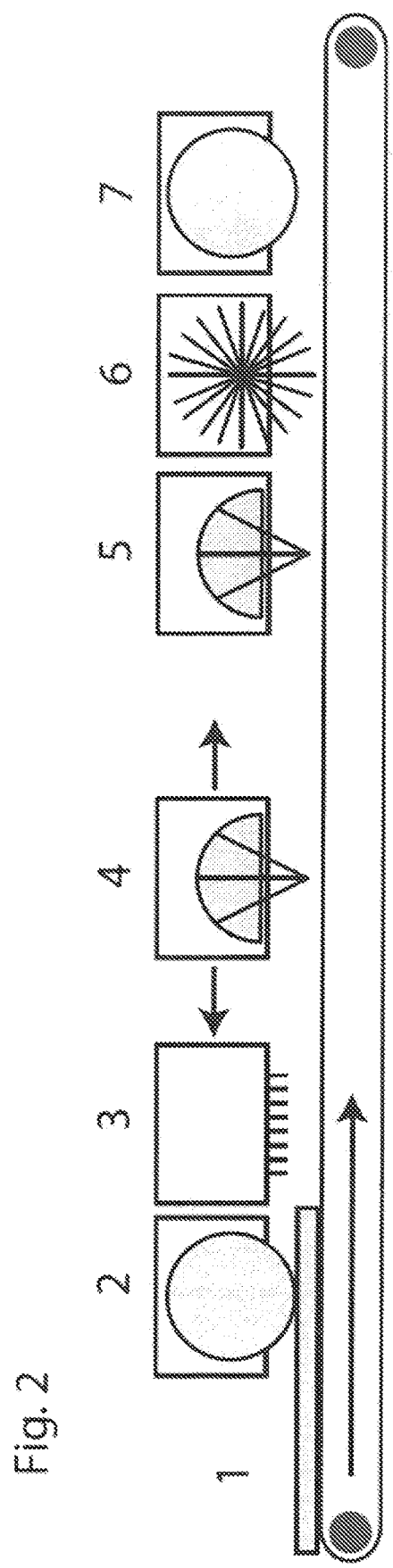

METHOD AND APPARATUS FOR GENERATING A SUPERFICIAL STRUCTURE

FIELD OF THE INVENTION

The present invention relates to a method and apparatus for generating a surface structure.

In particular, the invention relates to a method for making a three-dimensional structure on a substrate by digital printing.

The present invention is part of the technical field of materials and methods for generating three-dimensionality and embossing on surfaces of manufactured products, substrates, supports made of a different type of material, such as for example panels for producing floors, coverings, furnishings and, more generally, for architectural and design surfaces. The technology object of the invention can be further used to reproduce micro-structures that can be used in the biological, optical and electronic fields.

The present invention takes advantage of the combination of both the properties of traditional technologies offering high mechanical, chemical-physical properties and low costs, and the versatility of the digital technology allowing total customization and high precision.

State of the Art

Digital printing and, in particular, inkjet printing are increasingly asserting themselves in industrial sectors, replacing traditional methods based on analogue printing. The advantages of digital printing are considerable and comprise high flexibility, the possibility to produce small print runs and to reduce the waste of consumables.

In particular, the reproduction of wood on various materials is a typical application of digital printing in the production of floors, furniture panels, baseboards, profiles and, in general, in the design and architectural field.

Typically, the materials can consist of woods and derivatives (MDF/HDF/particleboard/plywood), plastics (PVC/polyolefins), metals, on which the image is printed and that in turn is normally protected by a varnish in order to increase its resistance to the abrasion and scratches.

In particular, in the case of floors and furniture panels, the finishing after printing provides the use of a melamine resin layer (laminates) or varnish applied with the usual techniques used (roller/spray/curtain/die coating). The varnish can be of various nature, photo-crosslinking, epoxy, polyurethane, hot-melt and can contain water and/or solvents to control its viscosity.

In the reproduction of natural materials such as woods and stones, in addition to the image, it is necessary to also reproduce its surface structure in order to obtain a material more similar to the original one, also to the touch.

The embossing usually is carried out on a surface layer and be obtained with various methods, traditionally by pressing with molds, rollers or tapes on which the structure to be printed is reproduced. The process can be carried out by pressure on resins that are not totally hardened, on thermoplastic materials, on photo-crosslinking resins with simultaneous irradiation and photo-polymerization.

Always with the aim of faithfully reproducing natural materials, a desired characteristic is that of having the embossed structure in register with the printed image, i.e. of obtaining matching between concavity/convexity and the printed image. With the traditional processes, the embossing in registration (EIR) is not simple to be obtained, both for the necessary precision and for the need have multiple molds corresponding to the various structures to be printed with the corresponding image.

Even more with the digital printing allowing to easily produce different images, a method to obtain the surface structure in a simple and efficient manner would be appropriate.

In fact, the modern scanners used to acquire the image of materials, for example METIS DRS 2000, also allow to simultaneously acquire the surface structure which can advantageously be used for embossing in registration.

Given the wide use of embossing, it should have characteristics of simplicity and low costs.

Currently, it is thus desirable to identify new methods for embossing the surfaces of the objects that are quick, easy to apply in register on the surfaces of different materials and at low costs.

In the past different technologies have been proposed that provide the formation of surface structures by using a photo-crosslinking formulation applied by inkjet technology on a photo-crosslinking liquid formulation:

The patent EP 2 555 878 B1 describes a method for making periodical structures.

The patent US20100092688A1 describes a method for forming structures on an organic film by the localized application of an immiscible liquid.

The patent EP 3 109 056 A1 provides the use of a UV formulation applied by inkjet printing on a non-polymerized UV varnish for generating three-dimensional structures in order to imitate the wood grain.

While the technologies described above provide a three-dimensional structure by digital technology, they suffer from the limitations linked to the control of the structure that can be obtained and from the fact of requiring varnishes suitably developed to maximize the 3D effect. In particular, they are limited when the varnish to be embossed contains anti-abrasive fillers such as aluminum oxide (corundum). Furthermore, the technologies cited above can be used with photo-crosslinking varnishes while they are hardly applicable to other types of varnishes.

SUMMARY OF THE INVENTION

According to an aspect of the invention, the Applicant found a method for making a three-dimensional structure on a substrate by digital printing technology.

The method of the invention advantageously provides the application, by digital printing, of a liquid B on a resin A and/or ink and/or varnish containing it when the resin A is not yet solidified or is partially solidified. The resin A and the liquid B are then solidified/polymerized also in different moments. In a subsequent step the polymerized liquid B is removed from the polymerized resin A thus generating a three-dimensional structure.

The method of the invention takes advantage of the different hardness of the materials applied in order to then remove the one that is more brittle, leaving the more tenacious material unchanged.

According to a first aspect, the invention thus relates to a method for generating a three-dimensional surface comprising the steps of:

A) applying a resin A on the surface of a material;
B) applying a liquid B on at least one portion of the resin A, when the resin A is liquid or partially solidified
C) polymerizing, also separately, the resin A and the liquid B;
D) removing the polymerized liquid B.

Embodiments of the present invention as defined above or as defined in claim 1 are set forth below.

The method of the invention faithfully reproduces a structure in register in efficient and economical manner.

Differently from the state of the art that for the Embossing in Registration (EIR) provides the etching of rollers or molds corresponding to the underlying printed image, the method of the invention uses the digital printing technology for making the embossing of the substrate. The method of the invention is flexible and able to manage single files.

Furthermore, the embossed structure obtained with the method object of the invention has the desired characteristics of resistance and hardness as the same protection varnish used for protecting the substrate is embossed, as in the case of the flooring panels or furniture or furnishings and fittings.

The versatility and resolution that can be obtained with the method of the invention allows to use it also in applications where micro-structures typical in the field of the microfluidics are used.

It is possible to provide four embodiment variations of the method according to the present invention, which methods are within the more general definition and which variants alternatively provide only one of the following steps:
- using a liquid B composition generating a filter effect which inhibits the polymerization;
- using monomers with low Tg, in particular with Tg lower than 20° C. and anyway a liquid B with Tg such that Tg of the mixture of resin A in combination with the liquid B is lower than Tg of the polymerized resin A;
- using liquids partially miscible or immiscible with the resin, such as for example water and PEG acrylate, as the liquid B;
- using water as the liquid B for generating a structure with holes in the application areas of said water, which areas are thus mechanically weakened with respect to the areas on which the liquid B has not been applied.

BRIEF DESCRIPTION OF THE DRAWINGS

FIG. 1 depicts two schematic reproductions of steps A)-D) of the process of the invention.

FIG. 2 depicts an embodiment of an apparatus for reproducing the method object of the invention;

DETAILED DESCRIPTION OF THE INVENTION

Figure 3:
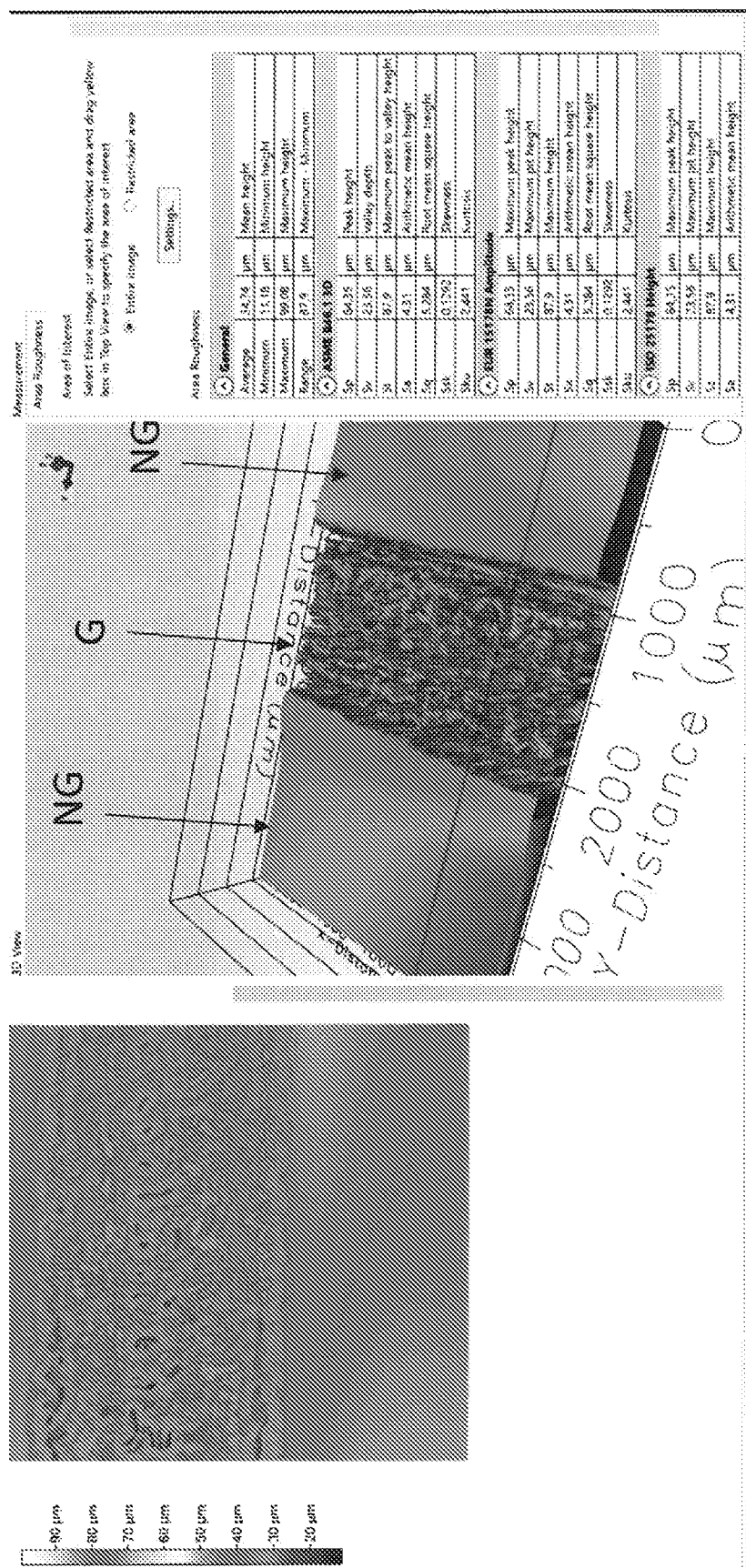
FIG. 3 shows an enlarged example and a perspective view of a "punctured" structure obtained by projecting water droplets with the aid of an inkjet application technique on the resin A not yet polymerized or partially polymerized. On the right side a measurement table of the areas comprising the holes is shown, whereas on the left a plot of the size of the areas of said holes is shown.

According to an aspect, the present invention relates to a method for making a three-dimensional coating embossed on a substrate, comprising the steps of:
A) applying a resin A or a varnish or ink containing it on the surface of a substrate (FIG. 2-1) thus forming a coating (FIG. 2-2);
B) applying a liquid B on at least one portion of the resin A (FIG. 2-3);
C) polymerizing/solidifying, also separately, the resin A and the liquid B (FIG. 2-4 and FIG. 2-5); D) removing the polymerized/solidified liquid B (FIG. 2-6).

In the following paragraphs the term polymerized and/or solidified will be used indistinctly to identify that, at the end of the process, a solid product will be obtained.

The method of the invention takes advantage of the different hardness of the materials applied in order to then remove the one that is more brittle, leaving the more tenacious material unchanged.

Typically, the resin A can have various chemical nature, such as for example, but not limited to, a polyurethane, epoxy, photo-crosslinking, acrylated, acrylic resin.

Preferably, the resin A is constituted by 100% solid in order to maximize the layer that can be embossed and frustrate the effect of the liquid B due to the evaporation of any solvent and/or water. On the other hand, for application needs the resin A could contain water and/or solvent, typically between 5% and 30%.

In a preferred embodiment of the invention, the resin A has a photo-crosslinking nature such as for example described in the text "Radiation Curing: Science and Technology" (Pappas).

The photo-crosslinking resins have in common the fact of polymerizing and hardening thanks to the energy irradiated by the ultraviolet ray devices and/or by irradiation with EB (Electron Beam) and are divided in two types based on the cross-linking mechanism: 1) radical resins, typically from vinyl monomers and acrylate resins that are divided in different subcategories: epoxy-acrylate, urethane-acrylate, polyester-acrylate, polyether-acrylate, amino-acrylate, silicon-acrylate, polyisoprene-acrylate, polybutadiene acrylate and acrylate monomers. Among the vinyl monomers can be cited N-vinyl caprolactame (NVC), acryloyl morpholine (ACMO), diethylene glycol divinyl ether (DVE-2), triethylene glycol divinyl ether (DVE-3) and mixtures thereof.

By the term acrylate both acrylate and methacrylate resins are meant.

2) cationic resin such as epoxy resin, polyols and monomers such as oxetanes and vinyl ethers.

The Applicant further unexpectedly found that, by varying the surface tension of liquid B and resin A, it is possible for the liquid B to more or less penetrate into the resin A and thereby modify the three-dimensional structure obtained after removing the polymerized liquid B.

In general, the more marked the difference of surface tension between the liquid B and the resin A, the higher the corresponding embossing effect.

The surface tension of the liquid B and the resin A can be modulated both by selecting the chemical nature of their base raw materials and by adding specific additives. For example, resins containing polar groups as hydroxyl, amines and aromatic groups will have a surface tension higher than resins containing linear structures of hydrocarbon type.

By way of example, regarding the choice of the raw materials, in the table below the surface tension of the more common photo-crosslinking monomers is shown:

| PRODUCT | SURFACE TENSION mN/m (25° C.) | g ° C. |
|---|---|---|
| Isobornyl acrylate | 32 | 0 |
| Isodecyl acrylate | 24 | 60 |
| 2-(2-ethoxyethoxy)ethyl acrylate | 30 | 53 |

| PRODUCT | SURFACE TENSION mN/m (25° C.) | g ° C. |
|---|---|---|
| Hexanediol diacrylate | 36 | 3 |
| Dipropylene glycol diacrylate | 34 | 04 |
| PEG300DA | 42 | 8 |

For what relates to the use of additives:

Additives reducing the surface tension: silicones, polyether silicones, acrylate silicones, polyether silicones acrylates, fluorinated surfactants, alkoxylated alcohols. Such compounds are easily available on the market, for example commercialized by BYK (BYK-UV) and EVONIK (Tego Rad, Tego Wet, Tego Glide).

Additives increasing the surface tension: amines, polyethers macromers-modified polyacrylates, silicon and polyethers macromers-modified polyacrylates. Such compounds are easily available on the market, for example commercialized by BYK (BYK 3560, BYK 3565).

Typically, the additives are added between 0.01 and 20%, or better between 0.01 and 10%, or better between 0.01 and 2%.

In preferred embodiment of the invention, the resin A can be in the form of hot-melt, such as Henkel-Technomelt.

In another embodiment of the invention, the resin A can be constituted by non-photo-crosslinking materials such as polyurethane, epoxy, PLASTISOL, hot-melt (such as Kleiberit-Hotcoating) resins.

Among the non-photo-crosslinking systems, PLASTISOL is of great interest being a mixture of PVC, plasticizers, additives and possibly solvents. PLASTISOL is commonly used as wear layer on PVC floorings such as for example LVT (Luxury Vinyl Tile). PLASTISOL is applied as a liquid, at about 150-500 g/m$^2$ and then solidified by a thermal process at 180-200° ° C. for 2-4 minutes.

In a preferred embodiment of the invention, the resin A is commonly used for protecting the floors and furniture surfaces from wear, scratches and abrasion, comprises one or more photo-crosslinking resins, photo-initiators and can contain loadings, such as for example aluminum oxide (corundum) to increase the abrasion resistance, talc for modifying its rheology, silica for reducing its brilliancy, calcium carbonate as filler loading, pigments to impart color, additives such as for example leveling agents, wetting agents, slip agents, rheology modifiers. The formulation of the photo-crosslinking resin can contain rheology modifiers, such as thixotropic agents having the function of better maintaining the shape of the embossing, both in terms of depth and definition.

In a preferred embodiment the liquid B is immiscible to partially miscible in the resin A and, once polymerized, is mechanically removed from the resin A. Thereby the liquid B has the only function of creating the three-dimensionality without altering the chemical-physical properties of the resin A. The polymerized liquid B is more brittle than the polymerized resin A and thereby can be mechanically removed from the resin A without damaging it. Consequently, if the resin A will mainly be of apolar nature, the liquid B will preferably be polar and vice versa.

In a preferred embodiment of the invention the liquid B, in its majority, is constituted by a photo-crosslinking resin. To be applied by ink-jetting, the liquid B must have viscosity of 10-15 cps at the shooting temperature)(40-50° ° C.

Consequently, similarly to other formulations (varnishes and inks) photo-crosslinkable by inkjet printing, the liquid B will be mainly formed by (meth) acrylate and/or vinyl monomers. On the other hand, in order to control the rheology and reach the desired degree of hardness, in addition to the monomers, the liquid B could also contain acrylate oligomers.

In order to obtain a brittle and easily removable formulation, ingredients characterized by low Tg can be used, such as isodecyl-acrylate, 2-(2-ethoxyethoxy) ethyl acrylate, octyl-decyl-acrylate, tri-decyl-acrylate, laurylacrylate, diacrylate polyethylene glycols of various molecular weight (200, 300, 400, 600 Dalton).

In a further preferred embodiment of the invention, the liquid B has sufficiently high surface tension, with respect to the resin A, so as to penetrate into the resin A while maintaining the shape and thereby creating detailed structures. If on the contrary the surface tension of the liquid B were too low with respect to that of the resin A, there would be a loss of definition, having as a result the fact that the liquid B will wet the surface of the resin A.

In a preferred embodiment of the invention, the liquid B is able to quickly penetrate and effectively mix with the resin A.

In another further preferred embodiment of the invention, the liquid B is able to quickly penetrate and not mix or partially mix with the resin A.

In a preferred embodiment of the invention, the liquid B contains a substance adapted to inhibit the polymerization of the resin A, thereby, after the polymerization, the areas printed with the liquid B will be more brittle than the resin A. For example, if the resin A is constituted by photo-crosslinking resins, the liquid B can contain polymerization inhibitors such as UV absorbers for example 2-hydroxyphenyl-benzophenones (BP), 2-(2-hydroxyphenyl)-benzotriazoles (BTZ) and 2-hydroxyphenyl-s-triazines (HPT); stereo-hindered amines (HALS) for example 2,2,6,6-tetramethyl piperidines (TMP); antioxidants (AO) for example sterically hindered phenols, secondary thioethers, phosphites, stabilizers (in-can stabilizer) for example quinone methide, radical scavengers.

In a further embodiment of the invention, the liquid B once polymerized has a Tg (Tg defined as the glass transition temperature) lower than the resin A and, consequently, the areas printed with the liquid B will be easier to be removed than the polymerized resin A.

In some embodiments, the liquid B contains additives which serve to modify properties such as the rheology and/or printability and/or color and can comprise photo-initiators, leveling agents, oils, light stabilizers, antioxidants, biocides, pigments, rheology modifiers, humectants, defoamers and mixtures thereof.

In a preferred embodiment of the invention the liquid B has a surface tension higher than the resin A.

Similarly to the resin A, the surface tension of the liquid B can be modulated both by selecting raw materials and by using additives, the same described above to modify the resin A.

In addition to modifying the surface tension to obtain more or less marked penetration effects, the addition of surface tension modifiers contributes to improve the printability of the liquid B, especially when using inkjet printers.

The control of the depth of the liquid B in the resin A can be modulated in a different way:
- by applying more liquid B
- by making more or less time passing between the application of the liquid B and the subsequent polymerization of the resin A and liquid B.
- by varying the speed of the droplet of the liquid B by using the waveform, where the quicker droplets will be able to sink deeper into the resin A.

Preferably, the liquid B has low viscosity and high solvent power towards the resin A. For example, the following monomers are listed as a function of the degree of solvent power: EOEOEA>THFA>HDDA>DPGDA.

The substrate usable in the method of the invention can be a material of different nature such as wood and derivative products for example MDF, HDF, particleboard, multi-layer wood, cellulose-based materials such as paper or cardboard, metals, plastic material (PVC, polyester, polyolefins), stone, glass, ceramic and compounds thereof.

The substrate is selected depending on the application of the method of the invention, for example for coating of furniture, floors, shutters and frames, profiles.

The substrate can have variable thickness depending on the application, for example in the case of decorative panels for furniture it is commonly between 8 and 20 mm whereas for the production of floors thicknesses between 2 and 6 mm are used. The method of the invention can also be used for creating structures over films, normally plastic or paper films, which are normally used for the coating and decoration of furniture and other furnishing surfaces.

The resin A which covers the substrate has variable thickness. By way of example, the resin A can have a thickness in the range of 1-500µ equivalent to 1-500 g/m² when the density of the resin A is 1 g/ml. Typically, to protect high-traffic flooring, grammage in the order of 80-120 g/m² are used. Obviously, nothing prevents higher quantities from being applied with the only purpose of obtaining deeper structures.

In an embodiment of the invention, the resin A has a thickness from 1 to 200µ, from 2 to 100µ, from 3 to 50µ, in the portion lacking the embossing and a thickness in the range of 0.05 to 100µ, from 0.5 to 50µ, from 1 to 25µ, in the embossed areas.

The process of the invention and the equipment for its realization will be more evident from the following description wherein the embodiments depicted in the attached FIGS. 1, 2 e 3 are referred to.

According to some embodiments, the resin A or varnish or ink to be embossed containing it, can be applied on the substrate with digital technology, for example, as depicted in FIG. 2 at point 3, by using the inkjet printing or else with the conventional techniques in use, such as roller/spray/curtain/die coating/slot-die.

In an embodiment of the invention, the resin A is a photo-crosslinking printing varnish and/or a photo-crosslinking printing ink applied by digital printing.

In some embodiments of the invention, the application of the liquid B occurs on the non-solidified resin A or varnish or ink containing it, of an underlying printed image.

Typically, the photo-polymerization by UV irradiation can be carried out with one or more Hg lamps and/or LED lamps, such as for example depicted in FIG. 2 at points 4 and 5.

According to an embodiment, the lamps are mounted on a mobile system allowing to bring them more or less close to the application system of the liquid B to better control the action of the same and thereby modulating its effect. For example, if you want to get a strong matt effect, the pre-polymerization/polymerization must occur immediately after the inkjet application, as depicted in FIG. 2, point 4.

At the end of the process object of the invention, there will be areas constituted by the polymerized resin A and areas constituted by the polymerized liquid B. Having such areas different hardness/toughness, it could be possible to selectively mechanically remove the material that is more soft/brittle while leaving the more hard/tenacious material unchanged (FIG. 2-6).

In another way of the invention, the liquid B is applied on the wear layer (resin A) on which the finishing is subsequently applied and consequently the mechanical removal of the polymerized liquid B.

What has been described above is quite similar to what happens in some natural materials, such as for example wood, where in the rusticating/brushing operations, the softer part of the wood is removed, thus leaving the harder one unchanged.

The mechanical removal of the polymerized liquid B can thus be carried out with the same machines used for rusticating/brushing the wood. Such machines use brushes and/or pads made of more or less aggressive materials (steel, brass, nylon fibers, polyester fibers) depending on the hardness of the material to be removed and the desired degree of finishing. The above described equipment is for example produced by CEFLA (e.g. RSP4) and QUICKWOOD (e.g. CDI/300+LEV).

The removal of the polymerized liquid B can also be carried out by air jet with high pressure or else by water jet with high pressure.

In a further embodiment of the invention, the polymerized liquid B can be removed by using an adhesive roller or tape which, once applied on the surface of the resin A, is then taken away at the same time of the removal of the polymerized liquid B which remains attached to the adhesive itself. The adhesive roller or tape can then be cleaned from the polymerized liquid B and re-used again.

In a further embodiment of the invention, the polymerized liquid B can be removed by using a suitable solvent.

In a preferred embodiment of the invention, after the removal of the polymerized liquid B, a finishing varnish is applied on the surface of the resin A in order to obtain the desired appearance in terms of brightness, feel and resistance to micro-scratches (FIG. 2-7).

In another embodiment of the invention, the application of the liquid B is carried out in two separate steps and this allows for example obtaining combined effects by using liquid B with different characteristics, such as for example the surface tension.

Typically, the method object of the invention provides the application of the liquid B by an inkjet head.

Inkjet printing can be both in multipass/scanning mode, wherein the image is generated with multiple passages of the head, while the material to be printed moves forward, or in singlepass mode, wherein the material to be printed only passes once under the heads which are installed at the width of the same material. Singlepass printing is used for long runs (>1000 m²/h), whereas the multipass printing used for short and medium runs (10-600 m²/h) is for sure the most common one.

Typically, inkjet printing provides the use of one head to create and jet liquid droplets that will then form the image to be printed. By way of example, details of this type of printing can be found in the book "Fundamentals of inkjet printing: the science of inkjet and droplets" (Hoath, Stephen).

Depending on the inkjet head used, the droplets produced can have different volume and consequently different diameters.

By way of example, the volume of the droplet and the corresponding diameter are set forth in the following table.

TABLE 1

| VOLUME (pl) | DIAMETER (μ) | VOLUME Lev. 1 (pl) | VOLUME Lev. 2 (pl) | VOLUME Lev. 3 (pl) |
|---|---|---|---|---|
| 1.5 | 3 | 1.5 | 3 | 4.5 |
| 2.4 | 5 | 2.4 | 4.8 | 7.2 |
| 3 | 6 | 3 | 6 | 9 |
| 6 | 13 | 6 | 12 | 18 |
| 10 | 21 | 10 | 20 | 30 |
| 12 | 25 | 12 | 24 | 36 |
| 30 | 64 | 30 | 60 | 90 |
| 80 | 170 | 80 | 160 | 240 |

In addition to the native size of the droplet, intrinsic characteristic of the head, bigger droplets can be generated by the head itself. For example, a head capable of jetting 4 gray levels, will have a droplet smaller than 6 μl whereas the bigger one will be 18 μl.

On the contrary of the digital embossing technologies currently existing on the market only using 1-bit printing, the method of the invention allows jetting droplets in gray-scale mode. This way the effects that can be obtained are widened with the possibility of creating different depths and, at the same time, surface micro-structures.

Typically, the method object of the invention is advantageously used for the production of furniture and/or floors. The preparation and finishing cycle is according to the material to be decorated and the desired performance.

For example, a typical cycle for the decoration of SPC (Stone Plastic Composite), a material currently in vogue for the production of flooring, provides the following operations:

TABLE 2

| Operation | Application | ype | g/m² | Notes |
|---|---|---|---|---|
| Smoothing of the substrate | | | | Optional |
| Adhesion primer | Roller | V | 8/10 | Optional |
| White | Roller | V | 20/40 | One or more applications |
| Printing primer | Roller | V | 8/10 | Optional |
| Digital printing | Roller | V | | |
| Adhesion primer | Roller | V | 8/10 | Optional |
| Wear layer | Roller | V | 40/120 | One or more applications. The amount is depending on the degree of desired abrasion resistance |
| Finishing | Roller | V | 10/20 | For the protection to scratches and for obtaining the desired degree of opacity |

The process object of the invention can be carried out both on the wear layer and on the finishing, preferably on the first one (FIG. 3).

In order to obtain different aesthetic effects, the wear layer and the finishing can have different degrees of opacity. In fact, if the wear layer has a gloss level higher than the finishing, a glossy pore will be obtained which will consequently be highlighted.

On the contrary, if the wear layer and finishing have the same gloss level, the pore will be less evident but with a more natural effect.

In a further application of the invention, the method can be used for producing molds and transfer films/embossing papers. The molds for pressing melamine are generally constituted by a metal plate which is then etched mechanically and/or by corrosion thereby generating the desired structure. The process is rather laborious and long and lasts for several weeks. The molds are then subjected to chromium plating, a harmful operation for the environment that should be banned in the near future.

On the other hand, the melamine pressing requires high temperature (160-180° C.) and pressure (15-70 bars) conditions, characteristics that often cannot be adjusted with the chemical-physical properties of the polymerized inkjet formulations. With the method of the invention a suitable resin A can be chosen instead, capable of resisting to the pressing conditions, and creating the negative of the structure which we will want to achieve after the pressing process. Similarly to the molds for the melamine pressing, the method of the invention can be used for producing molds for pressing ceramic, leather and plastics. In addition to the production of flat molds, the method of the invention can be used for the production of etching cylinders which have the same function of the molds but are mainly used on flexible materials.

Advantageously, the application of small droplets can be used to generate microgrooves and micro-wells of a few microns in size, typical of microfluidics, for producing sensors and functional devices.

A further application of the small droplets is to generate micro-structures which make the surface of the embossed varnish/resin/ink matt. With the latter application you can get simultaneously glossy and matt surfaces with interesting aesthetic effects. In another embodiment of the invention, the resin A can contain blowing agents in order to achieve high embossing volumes, but by limiting the weight of the embossed layer and/or the cost. Typically, it is possible to use hollow polymeric microspheres filled with gas, which increase the volume at given temperatures, for example EXPANCELS can be used. The expansion phase preferably occurs before applying the liquid B.

In addition to reproducing natural materials, such as wood and stones, the method object of the invention can also be used to generate three-dimensional structures typical of graphics and/or decorative fields.

Advantageously, the method object of the invention can be used to emboss surfaces printed in the traditional manner (rotogravure/flexo/offset).

The following embodiment examples are provided for illustrative purposes only of the present invention and are not to be understood as limiting with regard to the scope of protection defined by the claims annexed.

Example 1

The liquid B is poorly miscible with the resin A and the liquid B has low Tg once polymerized.

To a support made of melamine paper, 75μ of a photo-crosslinking varnish have been applied with a manual tool for spreading the film TEKNOS UVILUX 143-001 (resin A) for finishing floors.

Subsequently, on the still liquid varnish, by inkjet printer of single-pass type, it has been applied the liquid B constituted by:
Water: 47.5%
Di-acrylate monomer PEG600DA: 47.5%
Photo-initiator, TPO-L 5%

The support has been then immediately irradiated with a PHOSEON FIRELINE lamp at 395 nm and 8 W/cm$^2$ and subsequently with a Hg lamp at medium pressure DR. Honle of 160 w/cm to complete the polymerization of the resin A and liquid B.

After the application the surface appears homogeneous and the areas printed with the liquid B are evident to the naked eye.

While with a 2H pencil it is possible to remove the areas printed with the liquid B, it is not possible to remove the polymerized resin A. Thereby the three-dimensionality is created in the areas printed with the liquid B.

Example 2

The liquid B is miscible with the resin A and once it is polymerized, the mixture of resin A and liquid B has low Tg.

To a support made of melamine paper, 75μ of a photo-crosslinking varnish have been applied with a manual tool for spreading the film TEKNOS UVILUX 143-001 (resin A) for finishing floors.

Subsequently, on the still liquid varnish, by inkjet printer of single-pass type, it has been applied the liquid B constituted by:
Mono-acrylate monomer EOEOEA: 100%

The support has been then immediately irradiated with a PHOSEON FIRELINE lamp at 395 nm and 8 W/cm$^2$ and subsequently with a Hg lamp at medium pressure DR. Honle of 160 w/cm to complete the polymerization of the resin A and liquid B.

After the application the surface appears homogeneous and the areas printed with the liquid B are evident to the naked eye.

While with a 2H pencil it is possible to remove the areas printed with the liquid B, it is not possible to remove the polymerized resin A. Thereby the three-dimensionality is created in the areas printed with the liquid B.

Example 3

The liquid B contains UV polymerization inhibitors and is miscible with the resin A.

To a support made of melamine paper, 75μ of a photo-crosslinking varnish have been applied with a manual tool for stretching the film TEKNOS UVILUX 143-001 (resin A) for finishing floors.

Subsequently, on the still liquid varnish, by inkjet printer of single-pass type, it has been applied the liquid B constituted by:
Di-acrylate monomer DPGDA: 90%
Tinuvin 123: 10%

The support has been then immediately irradiated with a PHOSEON FIRELINE lamp at 395 nm and 8 W/cm$^2$ and subsequently with a Hg lamp at medium pressure DR. Honle of 160 w/cm to complete the polymerization of the resin A and liquid B.

After the application the surface appears homogeneous and the areas printed with the liquid B are evident to the naked eye.

While with a 2H pencil it is possible to remove the areas printed with the liquid B, it is not possible to remove the polymerized resin A. Thereby the three-dimensionality is created in the areas printed with the liquid B.

Example 4

The liquid B is immiscible with the resin A.

To a support made of melamine paper, 75μ of a photo-crosslinking varnish have been applied with a manual tool for stretching the film TEKNOS UVILUX 143-001 (resin A) for finishing floors.

Subsequently, on the still liquid varnish, the liquid B constituted by water has been applied by inkjet printer of the single-pass type.

The support has been then immediately irradiated with a PHOSEON FIRELINE lamp at 395 nm and 8 W/cm$^2$ and subsequently with a Hg lamp at medium pressure DR. Honle of 160 w/cm to complete the polymerization of the resin A.

After the application the surface appears homogeneous and the areas printed with the liquid B are evident to the naked eye.

While with a 2H pencil it is possible to remove the areas printed with the liquid B, it is not possible to remove the polymerized resin A. Thereby the three-dimensionality is created in the areas printed with the liquid B.

Example 5

A SPC panel has been subjected to the cycle described in Table 2.

The printer used (BARBERAN-JETMASTER) was equipped with SEIKO heads, whereas the printed image was obtained by a three-dimensional scan, carried out with a scanner (METIS), of a natural durmast veneer. The image was then uploaded in the printer by the dedicated software (RIP).

The line speed was 18 m/min.

After the digital printing 20 g/m$^2$ wear layer, which was then gelled, have been applied by roller.

Subsequently, 100 g/m$^2$ wear layer (resin A), still in the liquid form, has been applied, to which has been applied by inkjet printer of the single-pass type the liquid B constituted by:
Di-acrylate monomer DPGDA: 90%
Tinuvin 123: 10%

The panel has then been passed in a QUICKWOOD CDI/300 brushing machine equipped with 3 groups of steel brushes with wire having a diameter of 0.3 mm.

Subsequently, 10 g/m$^2$ matt finish varnish (6 gloss) polymerized with Hg lamps has been applied.

The three-dimensional structure is well defined and detailed, very similar to the scanned natural material.

The structure was then analyzed by laser profilometer analysis (3D profiler-USA), which gives a maximum depth of the structure of 95μ.

Example 6

To a support material (SPC), 100 g/m$^2$ PLASTISOL formulation (resin A) for LVT floor protection has been applied by roller.

Subsequently, the support has been passed under an inkjet printer of the single-pass type with which has been applied the liquid B constituted by:
Water: 47.5%
Diacrylate monomer: PEG600DA: 47.5%
Photo-initiator, TPO-L 5%

Subsequently, the panel was irradiated with ultraviolet light generated by a 160 w/cm Hg lamp at medium pressure for the polymerization of liquid B.

The panel has then been heated in oven at 180° C. for 3' in order to polymerize the PLASTISOL.

The panel has then been passed in a QUICKWOOD CDI/300 brushing machine equipped with 3 groups of steel brushes with wire having a diameter of 0.3 mm.

Subsequently, 10 g/m² matt finish varnish (6 gloss) polymerized with Hg lamps has been applied.

The three-dimensional structure is well defined and detailed.

Example 7

To a 400×400×3 mm C40 steel plate has been applied by slot-die (OSSILA), 300µ varnish (resin A) constituted as follows:
CN112C60: 90%
OMNICURE 184: 5%
OMNICURE TPO: 0.2%

Subsequently, the plate has been printed with a single-pass inkjet printer, the liquid B was constituted as follows:
Di-acrylate monomer DPGDA: 90%
Tinuvin 123: 10%

Subsequently, the plate has been passed under a Hg lamp (160 w/cm) at the speed of 12 m/min, the varnish (resin A) is hard to the touch.

On the surface the grain of the printed wood is evident.

The plate has then been passed in a QUICKWOOD CDI/300 brushing machine equipped with 3 groups of steel brushes with wire having a diameter of 0.3 mm.

The three-dimensional structure is well defined and detailed.

The plate with the structure has been used in a compression press wherein a 400×400×8 mm MDF panel was loaded on which a kraft paper impregnated with urea-formaldehyde resin was placed, on which a decorative paper impregnated with melamine-formaldehyde resin was placed and above the latter a melamine overlay was placed. Everything has been pressed for 30" at 180° C. and at a pressure of 20 bars.

At the end of EXAMPLE 7

To a support made of melamine paper, 75µ photo-cross-linking varnish for the floors finishing (TEKNOS UVILUX 143-001) has been applied with a manual film spreader.

Subsequently, the panel has been passed under an inkjet printer of the single-pass type with which has been applied the liquid B constituted by:
Diacrylate monomer, EOEOEA: 95.5%
HALS, TINUVIN 123: 5%

The support has then been immediately irradiated with a Hg lamp with medium pressure DR. 160 w/cm Hönle.

After the application the surface appears homogeneous and the areas printed with the liquid B are evident to the naked eye.

While with a HB pencil it is possible to remove the areas printed with the liquid B, it is not possible to remove the polymerized resin A. Thereby the three-dimensionality can be created in the areas printed with the liquid B.

FIG. 3 shows in the central area a perspective view of a portion of a resin A layer that has been subjected to the application of water by inkjet printer. As it is evident, the central area called G has a structure with micro-holes or constituted by a plurality of small cavities that are making said area G less resistant to a mechanical removal action than the areas not subjected to the application of water and denoted by NG.

In the plot on the left the size distribution of the micro-cavities or holes is shown and in the table on the right the measurement data are summarized.

The removal of the residual material in the embossed areas, G i.e. in the areas bombarded by water droplets generated by inkjet printing technology, is carried out after the polymerization step. The embossed areas are weaker and less resistant to the removal action than the non-treated areas.

Figure 4:
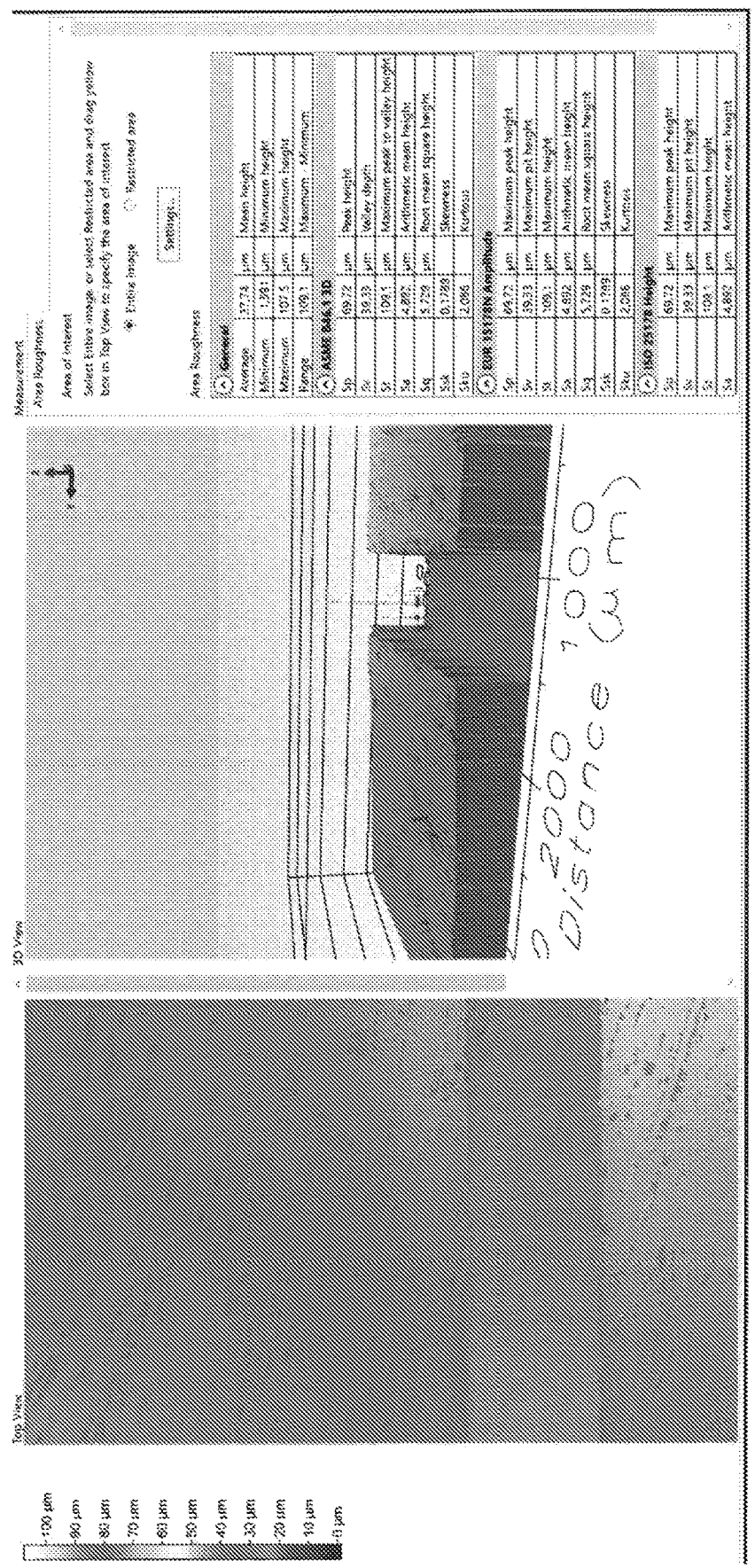
FIG. 4 shows the example of FIG. 3 after the step of removing the material of the area subjected to projection of the particles of the embossing liquid has been carried out.

FIG. 4 shows the example of FIG. 3 after the step of removing the material of the area subjected to projection of the particles of the embossing liquid has been carried out. As it is evident, a recess is formed with relatively sharp and precise, i.e. slightly jagged, side boundary walls.

The invention claimed is:

1. A method for producing a three-dimensional surface on a substrate comprising the steps of:
   A) applying a radiation curable resin A, or a paint or ink containing it, on the surface of a substrate thus forming a coating;
   B) applying a liquid B able to inhibit radiation curing polymerization at least on a portion of the resin A when the resin A is still liquid or partially solidified to form a mixture of resin A and liquid B,
   C) polymerizing the mixture of resin A and the liquid B,
   D) mechanically removing the polymerized mixture of resin A and the liquid B.

2. The method according to claim 1 wherein the resin A is selected from the group consisting of cationic photo-crosslinking resins, radical photo-crosslinking resins, epoxy resins, polyurethane resins, acrylic resins, polyester resins, and mixtures thereof.

3. A method according to claim 1, wherein the liquid B is dispersible, emulsifiable, or soluble in water.

4. The method according to claim 1, wherein the liquid B contains at least one substance selected from the group consisting of surface tension modifiers, acrylic resins, photo-crosslinking resins, photo-initiators, slip agents, wetting agents, oils, light stabilizers, antioxidants, defoamers, humectants, biocides, colorants, pigments, and mixtures thereof.

5. The method according to claim 1, wherein the liquid B has a surface tension higher than the resin A.

6. The method according to claim 1, wherein the liquid B includes a solvent.

7. The method according to claim 1, wherein the polymerized mixture of the resin A and the liquid B has one or both the following characteristics: Tg<20° ° C., or Tg lower than the resin A.

8. The method according to claim 1, wherein the polymerized mixture of resin A and liquid B is mechanically removed by means of brushing equipment.

9. The method according to claim 1, wherein the polymerized mixture of resin A and liquid B is removed by means of pressurized air and/or pressurized water jet.

10. The method according to claim 1, wherein the liquid B is applied by an inkjet printhead.

11. The method according to claim 1, wherein the liquid B is applied in two or more distinct steps by using different inkjet printing systems.

12. A method according to claim 1, wherein after removal of the mixture of resin A and liquid B, a coating is applied on the three-dimensional surface to provide further protection or to provide a gloss of the three-dimensional surface.

13. The method according to claim 1, further comprising the step of embossing a mold or embossing a paper for generating three dimensional surfaces with the method in which the substrate is the surface of a mold or of a paper to be used for generating three dimensional surfaces on a further substrate.

* * * * *